United States Patent
Tanaka

[11] Patent Number: 5,436,688
[45] Date of Patent: Jul. 25, 1995

[54] AUTOMATIC PHOTOFINISHING APPARATUS

[75] Inventor: Tadashi Tanaka, Kanagawa, Japan
[73] Assignee: Fuji Photo Film Co., Ltd., Kanagawa, Japan
[21] Appl. No.: 141,531
[22] Filed: Oct. 27, 1993
[30] Foreign Application Priority Data
  Oct. 30, 1992 [JP] Japan .................................. 4-293562
[51] Int. Cl.⁶ .............................................. G03D 3/08
[52] U.S. Cl. .................................. 354/320; 354/321; 354/322
[58] Field of Search .................................. 355/27–29, 355/77; 354/319–324, 340

[56] References Cited

U.S. PATENT DOCUMENTS 4,185,912  1/1980  Schwartz .............................. 355/28
4,864,354  9/1989  Crasnianski .......................... 355/27

FOREIGN PATENT DOCUMENTS 4203592  8/1992  Denmark .
0296080  12/1988  European Pat. Off. .

OTHER PUBLICATIONS

Patent Abstracts of Japan, P-1413, Sep. 1992, vol. 16, No. 418, 4-141646, "Automatic Developing and Printing Device for Photographic Sensitive Material".

Primary Examiner—D. Rutledge
Attorney, Agent, or Firm—Sughrue, Mion, Zinn, Macpeak & Seas

[57] ABSTRACT

An automatic photofinishing apparatus has a film processing section, which processes exposed photographic film, and includes a train of processing baths. The film is passed successively through processing solutions respectively within the processing baths. A printer section, downstream from the film processing section, prints an imaging frame of the film to photographic paper immediately after processing of the film. A paper processing section processes the paper after printing, and includes a train of processing baths. The paper is passed successively through processing solutions respectively within the processing baths, so as to produce photographic prints. A film path member is disposed between the film processing section and the printer section, and constructed to twist the film during an exit from the film processing section in accordance with a direction of the film processing section relative to the paper processing section, and to bring the film in parallel with the paper in the printer section.

11 Claims, 7 Drawing Sheets

AUTOMATIC PHOTOFINISHING APPARATUS

BACKGROUND OF THE INVENTION

1. Field of the Invention

The present invention relates to an automatic photofinishing apparatus for producing photographic prints from exposed photographic film, more particularly to an automatic photofinishing apparatus in which processing of exposed film, printing images on to photographic paper and processing of the paper can be performed consecutively.

2. Description Related to the Prior Art

A known automatic photofinishing apparatus, in which processing of exposed film, printing images onto photographic paper and processing of the paper can be performed consecutively, is disclosed for example in U.S. Pat. No. 4,864,354. The apparatus disclosed therein is constituted of a film processing section for processing exposed photographic film, and a paper processing section which is disposed along the film processing section and processes photographic paper after printing of images. To print respective negative images of the film upon being exited from the film processing section, two mirrors are disposed between a printing station for the film and an exposure station for the paper. The mirrors are adapted to direct the printing light passed through the negative image to be incident on a photosensitive emulsion surface of the paper. There are, however, problems in this construction, because photographic prints might be degraded, e.g. by an out-of-focus state of the negative image while any mirror is imprecisely fixed, and by image noises in reproduction while dust exists on the mirrors. There is another known photofinishing apparatus as disclosed in Japanese patent laid-open application No. 4-141646, according to which a film processing section is disposed linearly with a paper processing section, so as to face an emulsion surface of the film to an emulsion surface of the paper. This construction does not require a mirror in a printing light path.

However, the latter known apparatus has a problem in that the linear disposition of the film processing section and the paper processing section results in an elongated size, which requires a large space for installation of the apparatus. There is further inconvenience in view of operability during use of the apparatus: a position for inserting an exposed film is located most upstream in the film processing section, whereas a position for exiting photo prints is located most downstream in the paper processing section namely on the farthest end from the film inserting position, with respect to the linear disposition. When a plurality of strips of exposed film is successively treated in the photofinishing apparatus, an operator of a photo laboratory is obliged during operation to move frequently along the whole length of the apparatus.

SUMMARY OF THE INVENTION

In view of the foregoing problems, an object of the present invention is to provide an automatic photofinishing apparatus which can be constructed in a compact manner and in which convenience in operating the apparatus is improved.

Another object of the present invention is to provide an automatic photofinishing apparatus which can reproduce an image with high image quality.

In order to achieve the above and other objects and advantages of this invention, a film processing section processes the film, and includes a plurality of processing baths serially arranged, the film being passed successively through processing solutions respectively within the processing baths. A printer section is disposed downstream from the film processing section for printing an imaging frame of the film to photographic paper immediately after processing of the film. A paper processing section processes the paper printed by the printer section, and includes a plurality of processing baths serially arranged, the paper being passed successively through processing solutions respectively within the processing baths. Film twisting means is disposed between the film processing section and the printer section for twisting the film during an exit from the film processing section in accordance with a direction of the film processing section relative to the paper processing section, so as to bring the film in parallel with the paper in the printer section.

In accordance with the present invention, a size of the photofinishing apparatus can be reduced. Convenience in operating the apparatus is improved. Images can be reproduced with high image quality.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
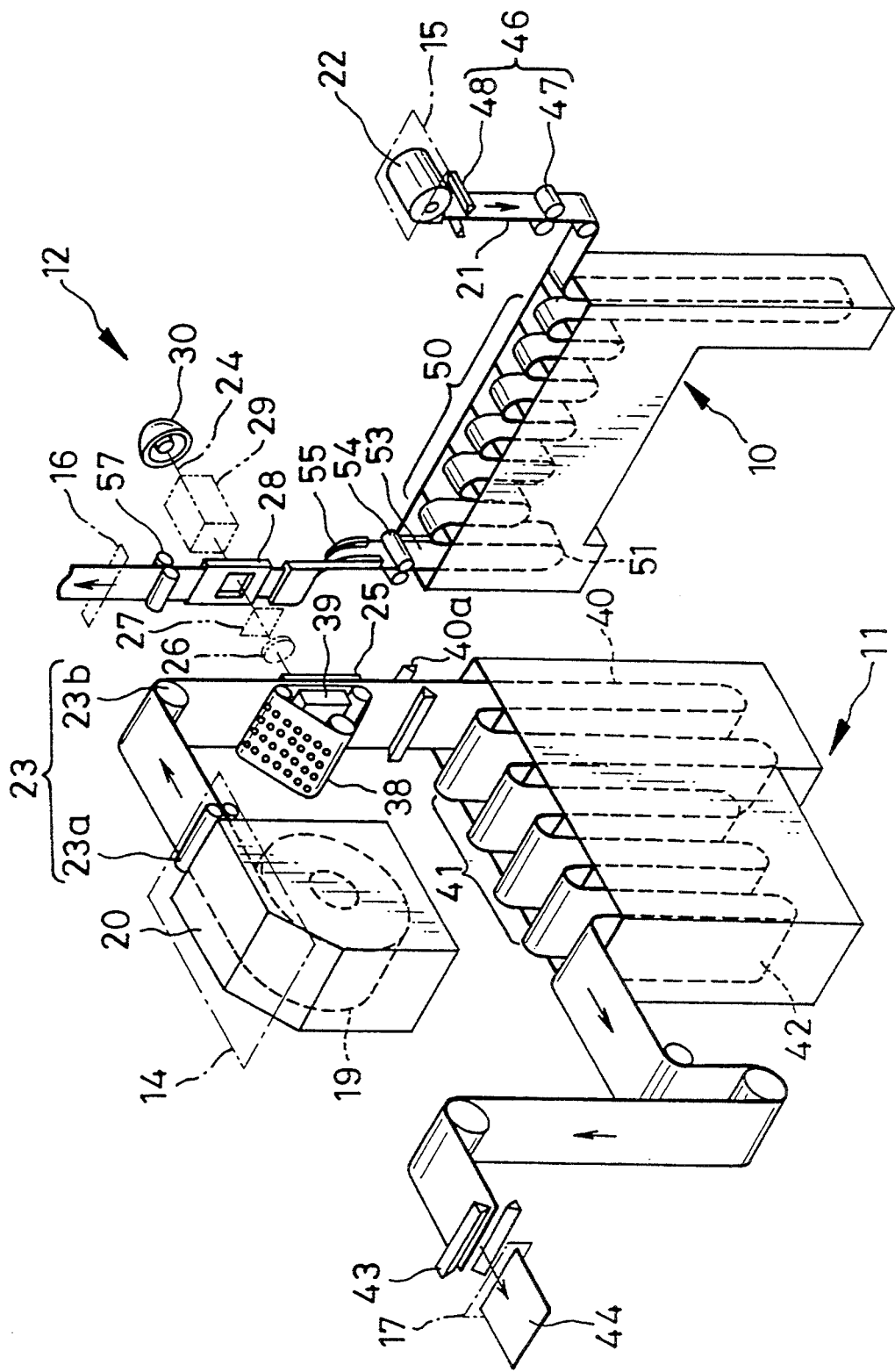
FIG. 1 is an explanatory view in perspective illustrating a novel automatic photofinishing apparatus.

In FIG. 1 illustrating an automatic photofinishing apparatus according to the present invention, a housing (not shown) contains a film processing section 10 and a paper processing section 11 arranged in an L-shape. A printer section 12 is also contained in the housing above the sections 10 and 11. In the housing, there are disposed a magazine holder 14, a cassette holder 15, a film exit 16 and a photograph exit 17. In the magazine holder 14 is set a magazine 20, which contains unexposed photographic paper 19 in a form of a roll. In the cassette holder 15 is set a photo film cassette 22, which contains an exposed photo film 21.

The magazine holder 14 has a paper feeder 23 which feeds the unexposed paper 19 toward the printer section 12. The paper feeder 23 is constituted of a pair of advancing rollers 23a and a directing roller 23b, and draws the paper 19 out of the magazine 20 while feeding it to the printer section.

Figure 2:
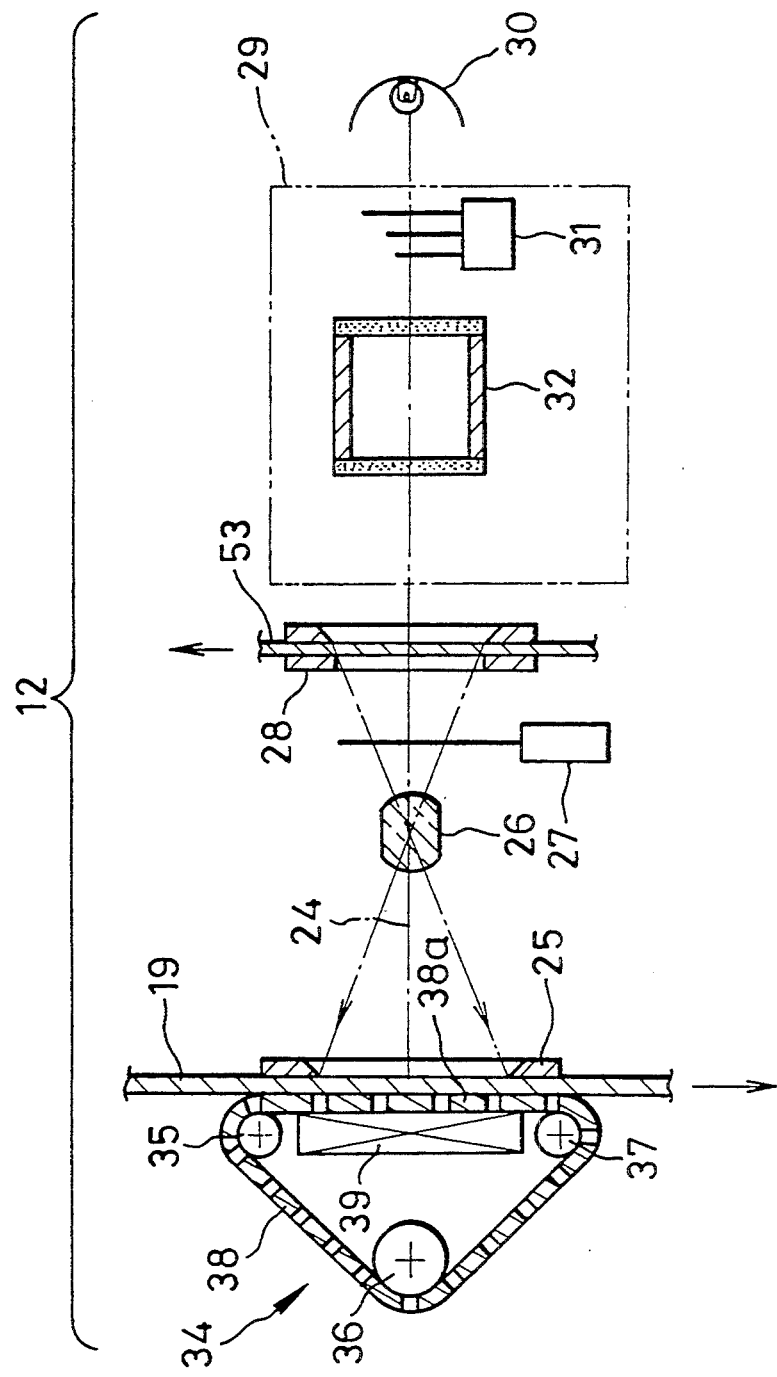
FIG. 2 is an explanatory view in section illustrating construction of a printer section.

As illustrated in detail in FIG. 2, the printer section 12 is constituted of a paper mask 25, a printing lens 26, a shutter 27, a film holder 28, an exposure controller 29 and a light source 30. As is known in the art of the photographic printing, the quality of printing light from the light source 30 is adjusted by a filter adjuster 31 incorporated in the exposure controller 29. The light emanated from the light source is diffused in a diffuser box 32 to be the uniform printing light, which illuminates an imaging frame of a developed film 53 set in the film holder 28. With a shutter 27 operated, an image in the frame on the developed film 53 is printed via the printing lens 26 on a photosensitive emulsion surface of the paper 19 as set on the paper mask 25.

Behind the paper mask 25 is disposed a paper driving mechanism 34. The paper driving mechanism 34 has three rollers 35, 36 and 37, around which an endless belt 38 is disposed. The endless belt 38 has air holes. A portion 38a of the belt 38 on the side of the paper 19 is moved downward vertically, and associated with a suction box 39. The suction box 39 applies sucking force to the paper 19 through the belt portion 38a. A back surface of the paper 19 opposite to the emulsion surface is sucked by the suction box 39, and tightly held on the belt portion 38a. During the suction, the frame is printed, after which the suction is stopped. The endless belt 38 is rotated while in contact with the paper 19, so as to transport the paper 19 downward a length corresponding to one frame. An exposed portion of the paper 19 is transported to the paper processing section 11.

The paper processing section 11 is constituted of a reservoir 40, a train of processing tanks or baths 41, a dryer 42 and a cutter 43. The reservoir 40 stores the paper 19 provisionally after printing in a looped form. The reservoir 40 has a cutter 40a, which cuts the paper 19 after the paper 19 is printed from one respective strip of the film 53. The bath train 41 is adapted to photographic treatment of the paper 19 after printing, and includes a developing/coloring bath, a bleach-fixing bath, a washing bath and a drying bath serially arranged. The cutter 43 cuts the paper 19 after development at each frame into sheets, and causes the sheets of the paper 19 to exit through an exit slot 17 as photographic prints.

With the cassette holder 15 is disposed a film feeder 46, which is constituted of a pair of feeder rollers 47, a cutter 48, and a metal tool for pulling out a leader of the exposed film 21 from the cassette 22. The pulling tool, well known in the art, is inserted into the cassette 22 through a passage port, is engaged with perforations in the film 21, and pulls the leader to the outside of the cassette 22. The rollers 47 rotate while squeezing the leader, and draw all the exposed film 21 from the cassette 22 in order to feed the film 21 to the film processing section 10. The cutter 48, when the exposed film 21 is all drawn out of the cassette 22, cuts the film 21 to separate it from the cassette 22.

The film processing section 10 consists of a train 50 of processing baths and a looper 51. The bath train 50 is adapted to photographic processing of the exposed film 21, and includes a developing/coloring bath, a bleach-fixing bath, a washing bath and a drying bath, which are arranged serially in the direction vertical to the bath train 41 for the paper 19. The looper 51 stores the film 53 provisionally after development in a looped form. Proximate the looper 51 are disposed a pair of intermediate rollers 54, which transport the developed film 53 to the film holder 28 through a path member 55. Note that, despite the appearance in FIG. 1, the film 21 is a strip having such a small length that it covers only a partial range within the processing section 10.

Figure 3:
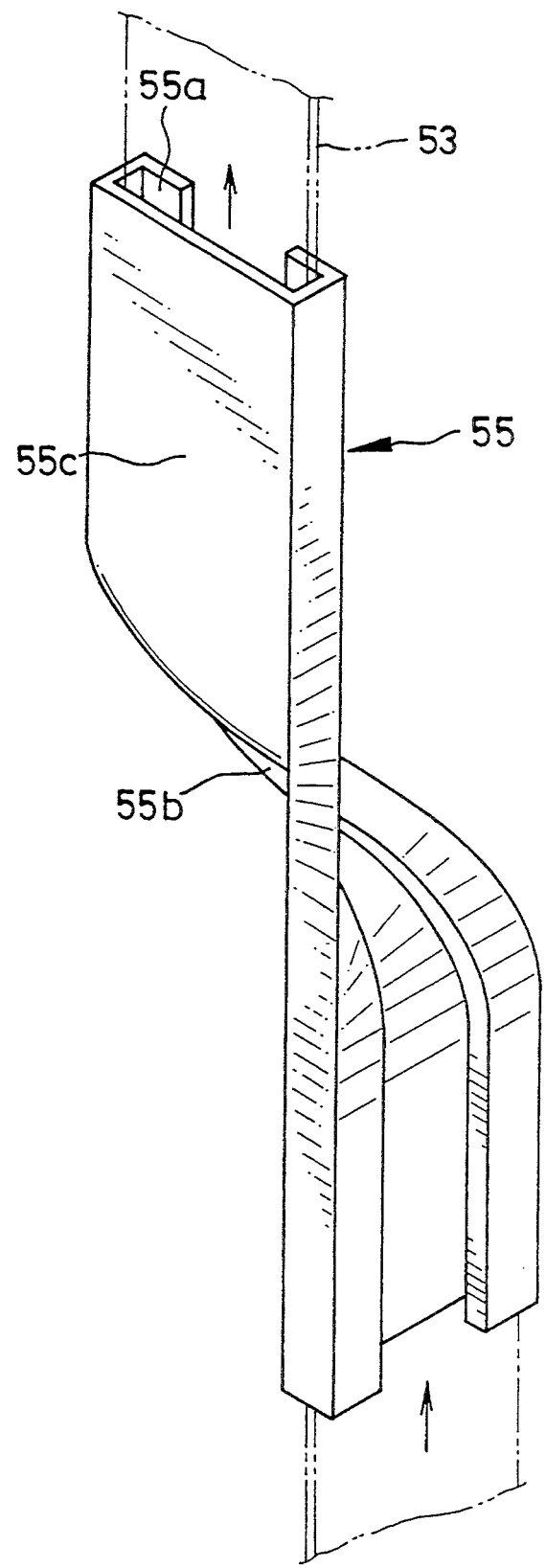
FIG. 3 is a perspective view illustrating a film path member.

As is illustrated in FIG. 3 in detail, the path member 55 consists of a plate portion 55c and a pair of lateral guiding portions 55a, which are formed on the plate portion 55c to define a passageway. The path member 55 has a twisted portion 55b which is curved three-dimensionally and where the plate portion 55c and the lateral portions 55a are twisted by 90 degrees. The plate portion 55c is twisted between the looper 51 and the film holder 28 to twist the film 53 counterclockwise in course of being fed upward, into the orientation where an emulsion surface of the film 53 faces to the emulsion surface of the paper 19.

The intermediate rollers 54 causes the film 53 inserted through the path member 55 to move intermittently by a distance of one frame, so as to set each imaging frame on the film holder 28 successively. Proximate the film exit 16 are disposed a pair of exit rollers 57. The exit rollers 57 rotate to exit the developed film 53, after printing, through the film exit 16. Note that, upstream from the film exit 16, there may be disposed a film cutting-inserter, in which the developed film 53 can be cut down into film pieces of shorter strips having imaging frames of a regular number. The film pieces can be inserted into bag portions of a film sheath before being exited.

The operation of the above construction is described. An operator sets the magazine 20 into the magazine holder 14, and the cassette 22 into the cassette holder 15. The magazine 20 and the cassette 22 can be efficiently set because the arrangement of the paper processing section 11 and the film processing section 10 is L-shaped such that the holders 14 and 15 are within easy access of manual operation of the operator still. Then the operator actuates the automatic photofinishing apparatus for operation of starting. Upon the starting operation, the pulling tool pulls the leader of the exposed film 21 out of the cassette. The exposed film 21 as drawn out is transported toward the film processing section 10 by the feeder rollers 47.

A trailer of the exposed film 21 is anchored on a spool. When all the film 21 is pulled out of the cassette 22, pulling force applied to the film 21 pulls the cassette 22 in the direction of pulling the film 21. The auto photofinishing apparatus has a limit switch (not shown), which is adapted to actuation in response to displacement of the cassette 22. The force applied to the cassette 22 in the film pulling direction causes the limit switch to detect the displacement of the cassette 22 which indicates completion of pulling out of the film 21. At the same time, the cutter 48 is driven to cut the film 21 off from the cassette 22. Note that the detection of the completion of pulling of the film 21 may be performed or other ways, such as by measuring an amount of feeding the film 21, or by measuring an increase of load applied to the feeder rollers 47 while the film 21 is pulled completely. The cassette 22 cut off from the exposed film 21 is removed from the cassette holder 15, and another film cassette is set in the cassette holder 15.

The film processing section 10 causes the exposed film 21 to move through processing chemical solutions within the bath train 50. The exposed film 21 is treated for development/coloring, bleach-fix, water-wash and drying. The developed film 53 after this chemical processing is moved to the looper 51. The developed film 53 is provisionally stored in the looper 51 in a looped form, and moved into the path member 55 by the intermediate rollers 54. The path member 55 is twisted by 90 degrees across the direction of the path, and causes the developed film 53 to twist. The developed film 53, after passage through the path member 55, is transported to the film holder 28. The film 53 now lies in a plane which is parallel to the paper 19. The emulsion surface of the film 53 faces the emulsion surface of the paper 19.

The intermediate rollers 54 stop the developed film 53 upon setting of a first imaging frame on the developed film 53 at the film holder 28. The exposure controller 29 causes the filter adjuster 31 to adjust positions of filters so as to adjust suitably exposure values. The exposure controller 29 controls the opening time of the shutter 27. The image set on the film holder 28 is exposed on the emulsion surface of the paper 19 to print the image. The paper 19 and the developed film 53 are transported by one frame, after which images to be printed are similarly exposed successively. The developed film 53 after printing is exited through the film exit 16 by the exit rollers 57.

The paper 19, after printing, is provisionally stored in the reservoir 40 in a looped form, and moved through the paper processing section 11. The paper processing section 11 causes the exposed paper 19 to move through processing solutions within the bath train 41. The exposed paper 18 is treated for development/coloring, bleach-fix, and water-wash. The developed paper 19 after this chemical processing is moved into the dryer 42, which dries the paper 19. The paper 19 after drying is cut by one frame. The paper 19 after cutting is exited through the photograph exit 17 as photographic print 44.

Figure 4:
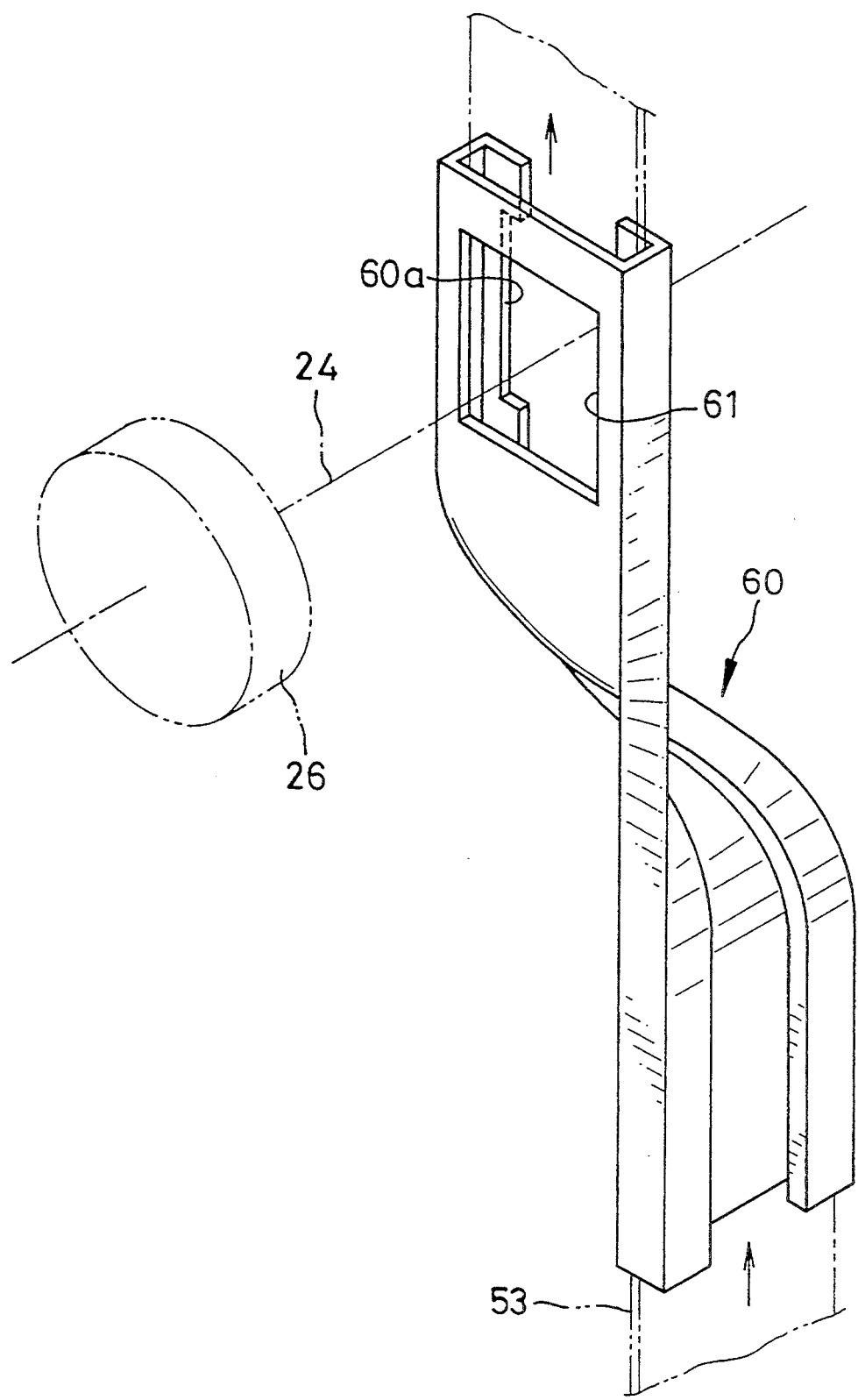
FIG. 4 is a perspective view illustrating a film path member having a printing opening.
Figure 5:
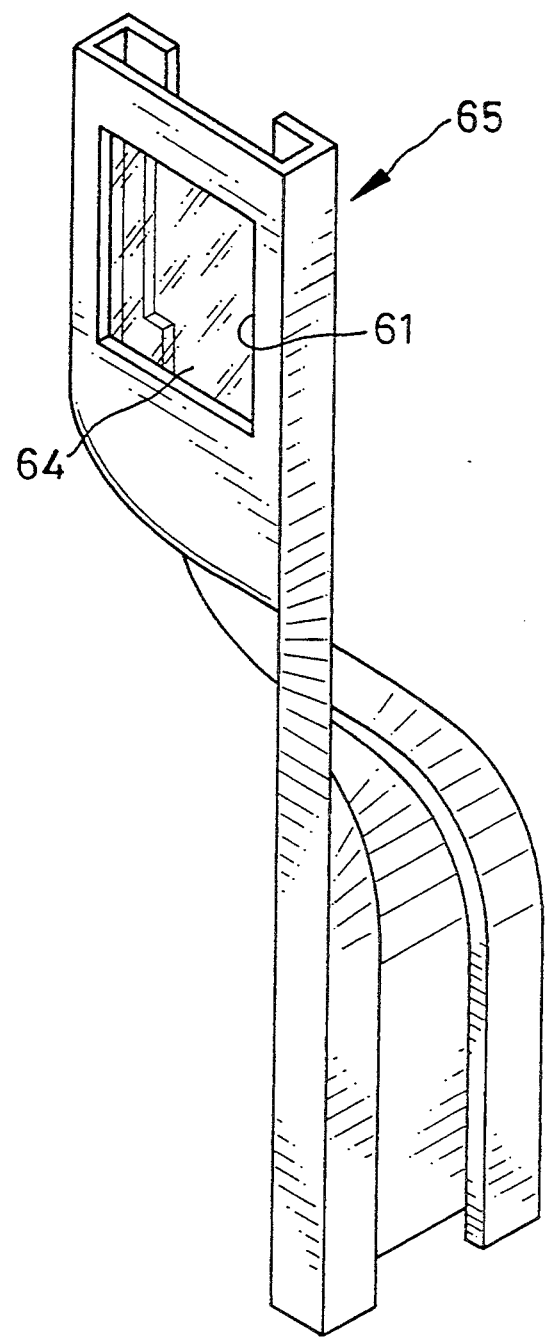
FIG. 5 is a perspective view illustrating another preferred film path member.

Note that, although the path member 55 in the above embodiment is separate from the film holder 28, a film holder can be integrated with a path member 60, which can have a printing opening 61, as illustrated in FIG. 4. The printing opening 61 formed in the path member 60 is directed to face the developed film 53 to the emulsion surface of the paper 19, and is located in a printing light path 24. The side of the path member 60 opposite to the printing opening 61 has a pair of recesses 60a defining a range in which one imaging frame on the developed film 53 stands uncovered. Further it is preferable to use a path member 64 having the printing opening 61 and a transparent plate 65 fitted inside the printing opening 61. The plate 65 is favorable because the developed film 53 is prevented from catching on the inner sides of the printing opening 61 during transport.

Figure 6:
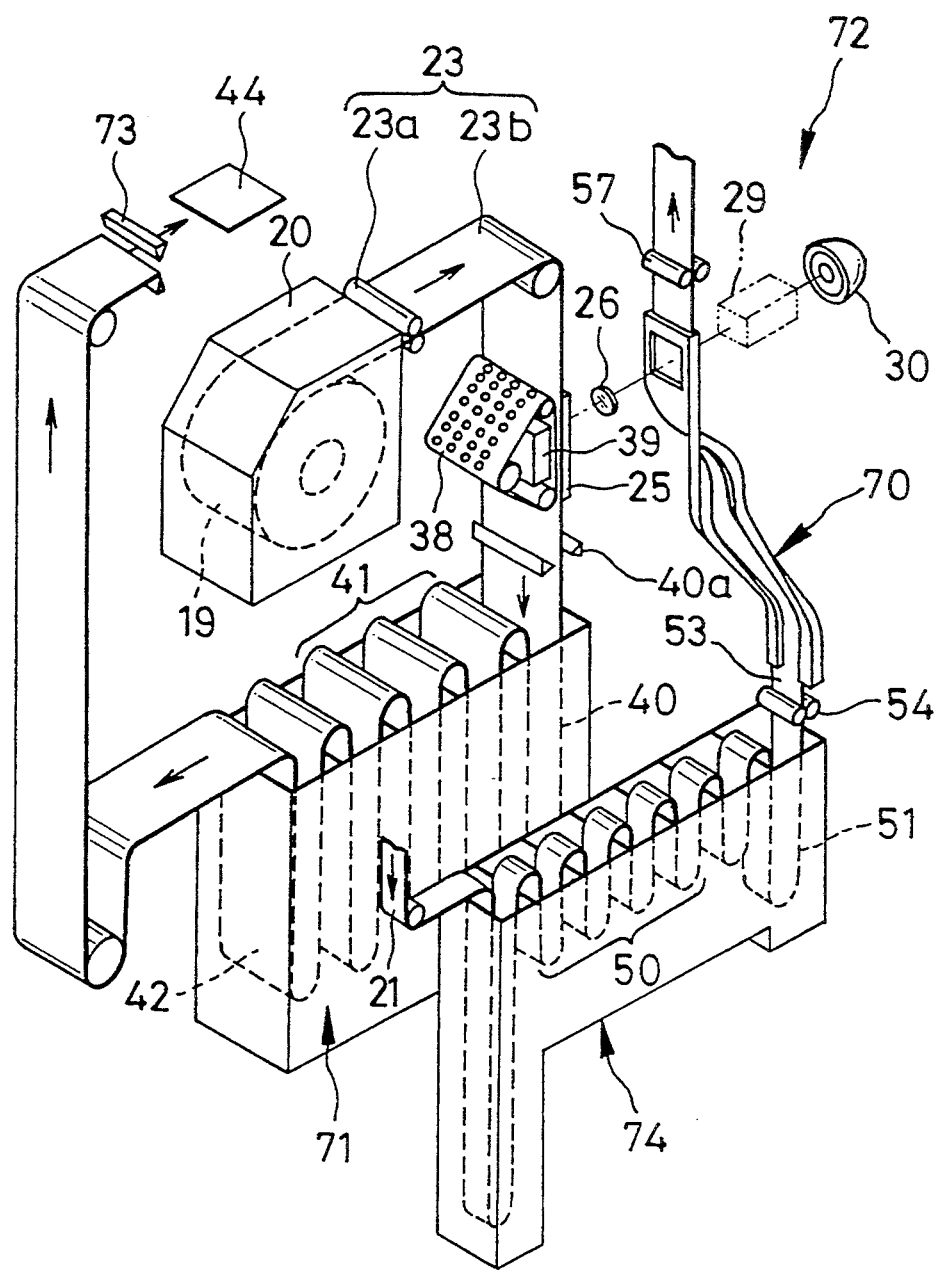
FIG. 6 is an explanatory view illustrating another preferred embodiment in which a film processing section is disposed in parallel with a paper processing section.
Figure 7:
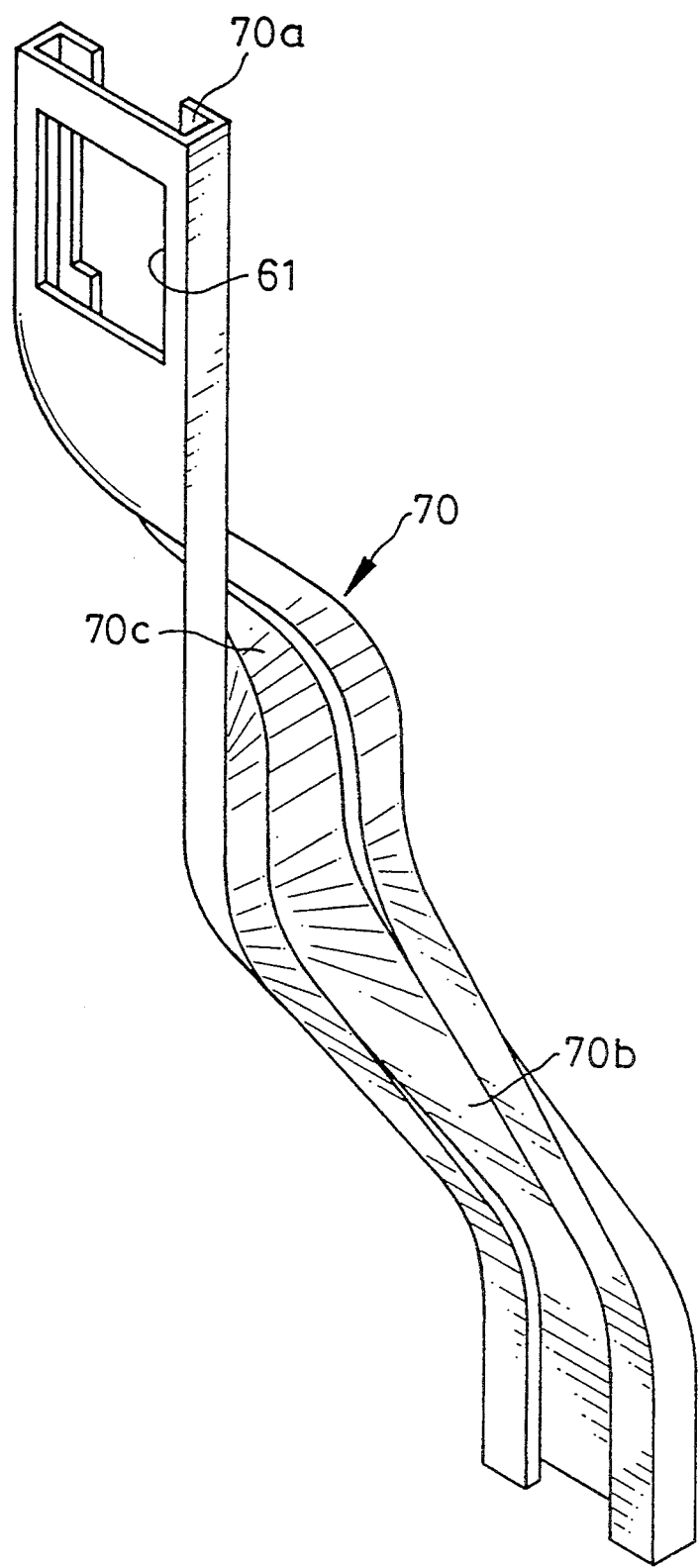
FIG. 7 is a perspective view illustrating a film path member in use in the apparatus in FIG. 6.

Although the bath train 41 in the paper processing section 11 is arranged vertically to the bath train 50 in the film processing section 10, the present invention is also applicable to an apparatus in which, as illustrated in FIG. 6, the bath train 41 in a paper processing section 71 is arranged parallel to the bath train 50 in a film processing section 74. As is illustrated in FIG. 7, a path member 70 has lateral guiding portions 70a formed on a plate portion to define a passageway. The path member 70 is provided with twisted portions 70b and 70c curved three-dimensionally to twist respectively by 90 degrees. The printing opening 61 is formed in the path member 70, is open in the printing light path 24 of a printer section 72. The path member 70 is twisted downstream from the looper 51 to twist the film 53 counterclockwise, into the orientation where the emulsion surface of the film 53 faces to an emulsion surface of the paper 19. Note that there is a cutter 73 which cuts the paper 19 after development at each frame into photographic prints.

Note that, althouth the path members 55, 60, 65 and 70 in the above embodiments have the plate portions in contact with the emulsion surface of the developed film 53, it is also possible to form path members with a plate portion contacting a back surface of the developed film 53.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An automatic photofinishing apparatus for producing photographic prints from exposed photographic film comprising:
   a film processing section for processing said film, said film processing section including a plurality of film processing baths serially arranged, said film being passed successively through processing solutions respectively within said film processing baths;
   a printer section disposed downstream from said film processing section for printing an imaging frame of said film to photographic paper immediately after processing of said film;
   a paper processing section for processing said paper printed by said printer section, said paper processing section including a plurality of paper processing baths serially arranged, said paper being passed successively through processing solutions respectively within said paper processing baths; and
   film twisting means disposed between said film processing section and said printer section for twisting said film after said film has exited from said film processing section so as to cause said film to lie in a plane which is parallel to a plane defined by said paper in said printer section and to cause said film and said paper to confront one another, said film being twisted so that a center line of said film after exiting said film twisting means is not in the same plane as a center line of said film before entering said film twisting means.

2. An automatic photofinishing apparatus as defined in claim 1, wherein:
   said film exits upward from said film processing section and subsequently passes upward through said printer section;
   said paper passes downward through said printer section and subsequently enters downward into said paper processing section; and
   in said printer section, an emulsion surface of said film is faced to an emulsion surface of said paper.

3. An automatic photofinishing apparatus as defined in claim 1, wherein said paper processing section is disposed vertically with respect to said film processing section, and said twisting means twists said film as said film travels vertically.

4. An automatic photofinishing apparatus as defined in claim 1, wherein said paper processing section is disposed in parallel with said film processing section, and said paper processing section transports said paper in a direction which is reverse to a direction in which said film is transported in said film processing section.

5. An automatic photofinishing apparatus as defined in claim 4, wherein said twisting means twists said film through 180 degrees.

6. An automatic photofinishing apparatus as defined in claim 1, wherein said twisting means comprises twisting film path means, and said twisting film path means has a plate portions for guiding one surface of said film, and edge guiding portions formed along lateral sides of said plate portion to define a channel shape.

7. An automatic photofinishing apparatus as defined in claim 6, wherein said plate portion is in contact with said emulsion surface of said film.

8. An automatic photofinishing apparatus as defined in claim 7, wherein said printer section includes:
 a printing station in which a respective imaging frame on said film as processed is set successively;
 an exposure station in which said paper is set in an unexposed state.
 a printing lens disposed between said printing station and said exposure station in order to project to said paper an image of said imaging frame set in said printing station; and
 a light source for illuminating from a rear said imaging frame set in said printing station.

9. An automatic photofinishing apparatus as defined in claim 8, wherein said twisting film path means is provided with a printing opening formed in a portion of said twisting film path means which extends into said printing station.

10. An automatic photofinishing apparatus as defined in claim 9, wherein a transparent member is fitted inside said printing opening.

11. An automatic photofinishing apparatus for producing photographic prints from exposed photographic film, comprising:
 a film processing section for processing said film, said film processing section including a plurality of film processing baths serially arranged, said film being passed successively through processing solutions respectively within said film processing baths;
 a printer section disposed downstream from said film processing section for printing an imaging frame of said film to photographic paper immediately after processing of said film;
 a paper processing section for processing said paper printed by said printer section, said paper processing section including a plurality of paper processing baths serially arranged, said paper being passed successively through processing solutions respectively within said paper processing baths; and
 film twisting means disposed between said film processing section and said printer section for twisting said film about an axis which corresponds to a longitudinal edge of said film after said film has exited from said film processing section so as to cause said film to lie in a plane which is parallel to a plane defined by said paper in said printer section.

* * * * *